Dec. 25, 1951
C. C. DOUGLAS ET AL
2,579,656
BY-PASS METER BAR
Filed Jan. 31, 1949
2 SHEETS—SHEET 1
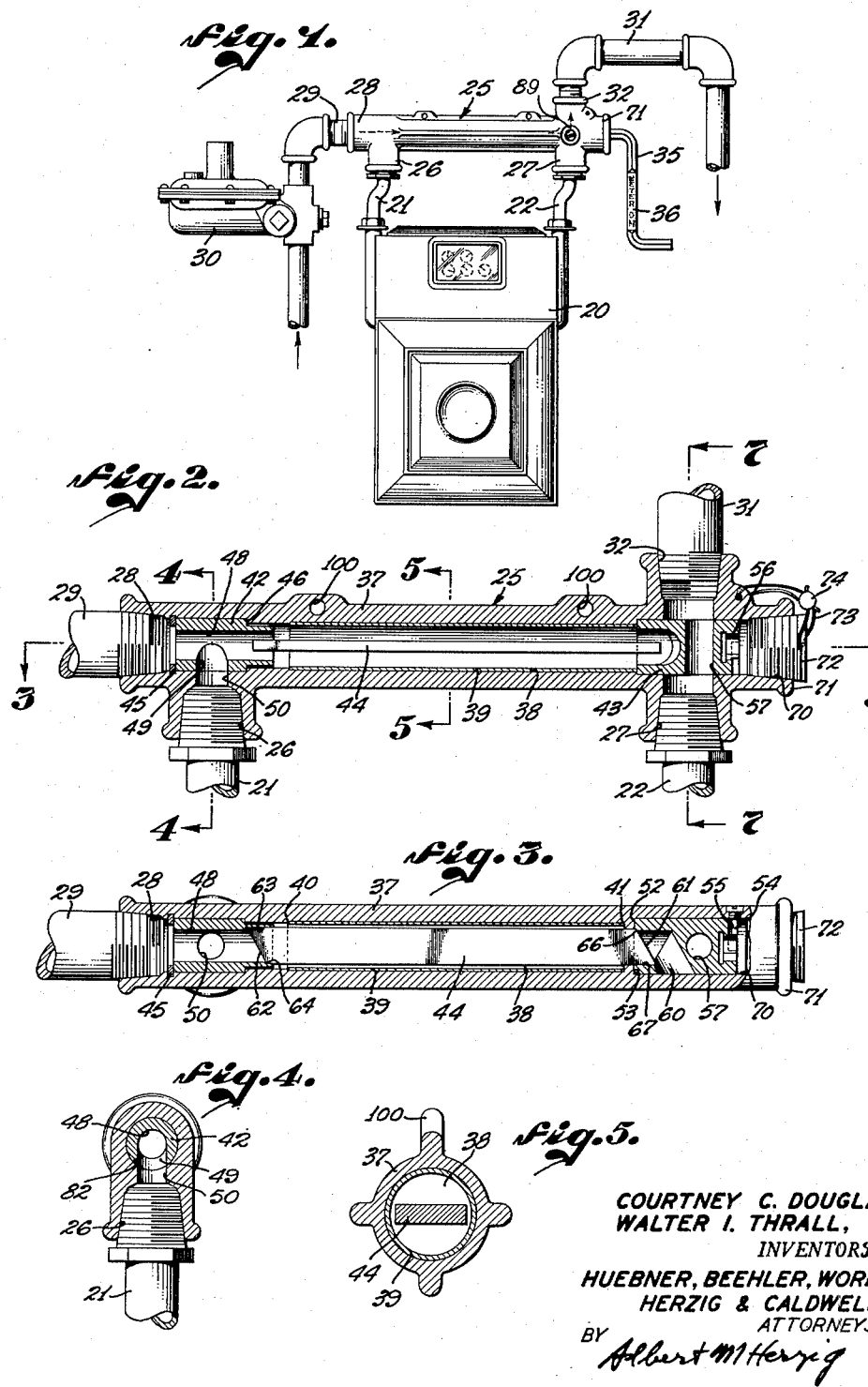
COURTNEY C. DOUGLAS,
WALTER I. THRALL,
INVENTORS.
HUEBNER, BEEHLER, WORREL,
HERZIG & CALDWELL,
ATTORNEYS.
BY Albert M Herzig Dec. 25, 1951     C. C. DOUGLAS ET AL     2,579,656
BY-PASS METER BAR
Filed Jan. 31, 1949                                                           2 SHEETS—SHEET 2
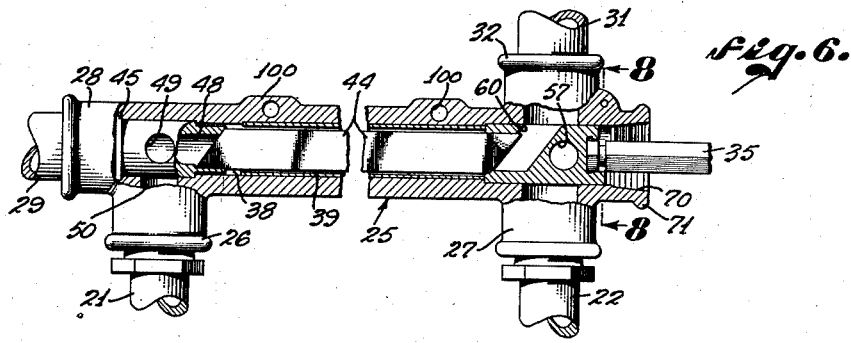
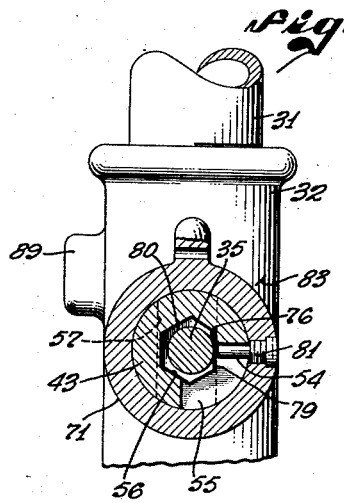
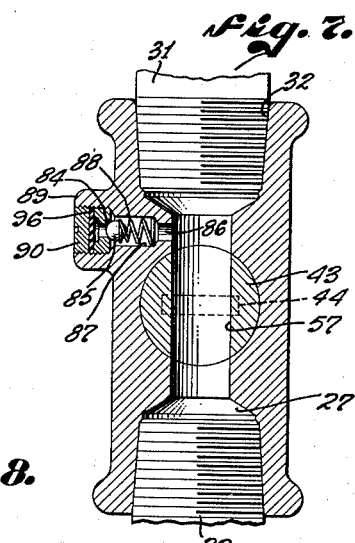
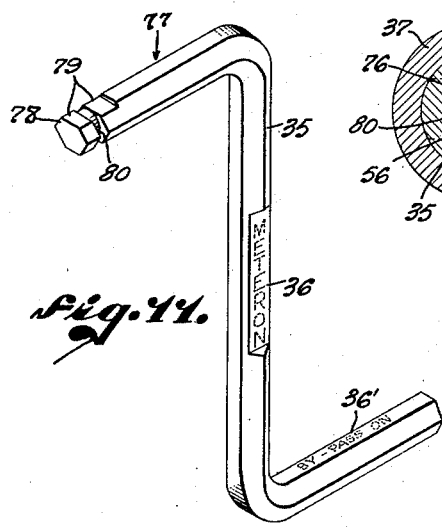
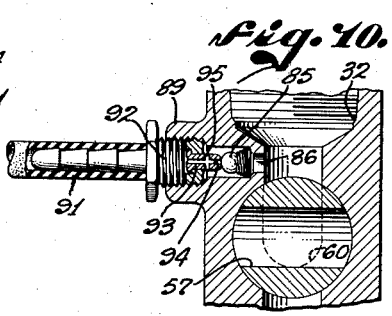
COURTNEY C. DOUGLAS,
WALTER I. THRALL,
            INVENTORS.
HUEBNER, BEEHLER, WORREL,
  HERZIG & CALDWELL,
BY                ATTORNEYS.
*Albert M Herzig*

Patented Dec. 25, 1951

2,579,656

UNITED STATES PATENT OFFICE 2,579,656

BY-PASS METER BAR

Courtney C. Douglas, Arcadia, and Walter I. Thrall, South Pasadena, Calif., assignors to The Deutsch Company, Los Angeles, Calif., a partnership Application January 31, 1949, Serial No. 73,744

8 Claims. (Cl. 73—201)

This invention relates to meter bar passes for domestic and commercial public utility meters and more particularly to a new and improved combination of by-pass and meter bar construction for gas meters and the like as commonly employed.

It is customary in the installation of residential and commercial service meters, e. g., gas meters, to provide opposed inlet and outlet connections supported upon a superior horizontally disposed solid metal bar to which supply and discharge pipes from public distribution mains may be supported.

From time to time, as required, and otherwise after a specified interval of time, usually established by law, all such meters must be replaced, repaired, or checked. After any considerable period of continued and uninterrupted use, most such meters are in need of recalibration or such other attention as requires their removal from the service line.

As can be appreciated, numerous service employees are required to make repairs and replacements, a task involving considerable labor, cost and time factors.

It is intended by the instant invention to save time and labor, without attendant waste of materials, by providing a suitable combined by-pass and meter support bar by means of which the meter may be removed without interruption of service. Under conventional practice, meter servicing employees before removing a meter must shut down the service and for such purpose must notify the consumer. If he is not present at the premises, as is frequently the case, the service cannot be shut down nor the meter removed. The employee must then return at a later date or as frequently as necessary to find the consumer on the premises or arrange an appointment by telephone or otherwise. Even when the consumer is present, however, the employee must make a routine check of the premises to shut off every appliance and every automatic pilot then in use. The added inconvenience to the consumer who is temporarily denied service is equally apparent.

Again, following resumption of service, all appliances must be re-checked and pilots re-ignited. The very presence of the employee reminds many consumers of innumerable, too often petty, grievances and complaints to which further attention must be paid with accompanying time-consuming conversational pleasantries.

It is therefore an object of this invention to provide a new, improved and convenient by-pass construction for overcoming many of the above currently objectionable conditions.

It is another object of the invention to provide a new and improved by-pass, particularly suited to gas service meters but not necessarily confined thereto, and which may be substituted for conventional meter bars now regularly employed without altering present service practice or equipment.

Another further object of the invention is the provision in a new and improved meter bypass bar of the desired character described of a new and improved tamper-proof operating mechanism and improved sealable means for preventing unauthorized use of the by-pass.

Yet another object of the invention is the provision of a meter by-pass having new and improved safety features incorporated therein and which may be conveniently assembled or disassembled for cleaning, replacement of parts, or repair.

Among some of the more specific objects of the invention is the provision of a unitary device whose parts and whose valve elements are appropriately associated and constructed for simultaneous or optionally selective operation, in which the pressure in the service line may be continuously tested either while the meter is in use or during removal of the same, which has readily visible means for indicating whether the by-pass is in use or not, and which may be utilized to purge a new meter and associated lines without interference with its function as a by-pass.

This invention also has among its objects the improvement of prior art devices heretofore intended for similar purposes, which objects are more fully set forth in the following description, pointed out in the appended claims, and illustrated in the accompanying drawings.

In the drawings:

Figure 1 is an elevational view of a by-pass meter bar embodying this invention as used.

Figure 2 is an enlarged sectional elevational view of the by-pass as installed, portions of the installation system being cut away.

Figure 3 is a plan sectional view taken as on a line 3—3 of Figure 2.

Figure 4 is a vertical sectional view taken as on a line 4—4 of Figure 2.

Figure 5 is a vertical sectional view taken as on a line 5—5 of Figure 2.

Figure 6 is a vertical sectional view similar to Figure 2, parts being cut away, an operating handle portion inserted, and the parts shown in a different operative position.

Figure 7 is a vertical sectional view taken as on a line 7—7 of Figure 2.

Figure 8 is a vertical sectional view taken as on a line 8—8 of Figure 6.

Figure 9 is a view similar in part to Figure 8 but showing the parts in a different operative position corresponding generally to their arrangement in Figure 2 but incorporating the operating handle.

Figure 10 is an enlarged fragmentary sectional view of a valve for manometer readings embodying this invention, as used.

Figure 11 is a perspective view of a handle embodying this invention.

Referring more particularly to the drawings, there is illustrated by way of example, but not of limitation, a gas meter 20 including inlet and outlet connections 21 and 22, respectively, ordinarily, though not necessarily disposed in horizontally spaced relationship.

A combination meter bar and by-pass 25 may be threadedly secured to the meter as by means of a female outlet 26 and a female inlet 27. A supply inlet 28 may be connected to a pipe 29 receiving from the gas supply mains as through a pressure regulating valve 30.

Similarly, a pipe 31, connected to a service outlet 32 of the by-pass, conducts the gas to a residence or commercial establishment for use. An operating handle or the like 35 may have a legend 36 thereon visible from any desired point of vantage, as from the top, as shown, or optionally from the front, of the meter to indicate whether the by-pass is on or off.

Such handle may be inscribed with other suitable indicia 36' similarly visible from such vantage point when the by-pass is in another operative position, as illustrated, for example, in Figure 6. The handle is preferably removable, as will be explained hereinafter, when the by-pass is, as such, inoperative.

The by-pass preferably comprises a tubular housing 37 substantially in the form of a meter bar having a hollow interior or by-pass conduit 38. A steel tube or the like 39 usable in forming the housing 37 in the manufacture thereof, may be retained for strengthening purposes, if desired, and may be secured therein as by integral shoulders 40 and 41.

An inlet valve element 42 and an outlet valve element 43 connected operatively together as by means of a key 44 comprise the valve for the by-pass.

The valve inlet element may be secured against axial removal from the housing 37 as by a snap ring 45 and annular cooperative shoulders 46. An axial inlet passage 48 may selectively communicate through a lateral port 49 with a corresponding port 50 formed in the meter outlet 26.

The outlet valve element 43 is secured in the housing for common rotation with the inlet valve element at the opposite end of the by-pass housing in which is formed a shoulder 52 abutable with the end 53 of the outlet valve element. A screwpin 54 may form an abutment engageable with an angular cut-out 55 for retaining the valve element 43 within the housing 37 and also to limit the degree of rotation of the valve elements 42 and 43 between the extremes of "by-pass on" and "by-pass off" positions (e. g., Figures 8 and 9, respectively), the latter corresponding with the "meter-on" position.

A transverse, optionally offset passageway 57 is formed in the outlet valve element and communicates between the meter inlet 27 and the utility or service outlet 32 when the by-pass is off as illustrated, for example, in Figure 2. A diagonal passageway 60 (cf. Figure 3) which may be partially formed by the end 61 of the key 44 communicates with the interior 38 of the by-pass and, when the by-pass is on, as it is for example in Figure 6, likewise selectively communicates with the service outlet 32.

The key 44 is formed with the asymmetrical end 61 and an optionally corresponding asymmetrical end 62, the latter slidable axially in a relatively long keyway 63 and into a diametrically opposite shorter keyway 64. Likewise, the end 61 of the key is engageable as in a short keyway 66 and a long keyway 67 in diametrically opposed positions on the valve element 43. By this construction it is possible to remove the valve elements individually as well as the key 44, but these elements are capable of assembly on the key only when the port 49 and passage 57 are in proper alignment.

A port 70 formed in the end 71 of the housing may be threaded to receive a sealing plug 72 normally secured against tampering as by a wire 73 locked as by a metal seal or the like 74. A non-symmetrical recess 56 optionally substantially hexagonal, as illustrated most clearly in Figures 8 and 9 (see also Figures 2, 3, and 6), having one side 76 longer than the other, communicates with the cut-out 55 and is adapted to receive the end 77 of the handle 35 in one rotative position of the handle and the valve element 43. Said handle end 77 includes a non-symmetrical portion 78 matching the recess 56 and including a flat face 79 corresponding to the long side 76 of the recess. Another portion 80 is undercut and circular in cross-section to accommodate the pin 54 when the handle is fully inserted in the recess 56. The end 77 of the handle is removable from the recess in the same rotative position as it is inserted. In other rotative positions the pin 54 engages within the undercut 80 and prevents withdrawal of the handle.

It is desirable at all times during repair of the meter, both prior and subsequent to its removal or the like, that gas pressure in the service pipe 31 be maintained to insure that no automatic appliance or other utility in use is momentarily deprived of gas. Accordingly, a ball check valve 85 controls a port 86 having a counterbore 87 providing a valve chamber in which a spring 88 normally urges the ball valve 85 into closed position against its seat 84 preferably threadedly connected in a boss 89 lockable by a plug 90 (Figure 7). Upon removal of the plug 90 connected as through the hose 91, a manometer or other suitable gauge (not shown) may be threadedly connected as by a coupling 92 in the check valve opening. The coupling 92 may include a finger 93 having an axial bore 94 and a communicating cross-bore 95 by which the valve may be held open (Figure 10) while the gauge is in use. The plug 90 is replaced with a suitable washer 96 when the valve is not being used.

The operation of the by-pass above described is such that when installed in lieu of the customary meter bar or support, as by means of perforate ears 100, fluid can flow from the supply pipes 29 into the interior 38 of the housing 37, by way of the passage 48, ports 49 and 50, meter supply pipe 21, meter 20, meter outlet pipe 22, inlet 27, transverse passage 57 and service pipe 31 (cf. Figures 2, 3, 4, 5, 7, and 9). In such condition of the parts the diagonal passage 60 in the valve element 43 is closed.

If desired, the hollow interior 38 of the housing may be closed off by an appropriate construction on the valve element 42. It is preferable, however, that only one such closure be present so that the entire by-pass may be at all times filled with the gas thus insuring against unwanted air pockets or dead spaces.

When the handle 35 is inserted in the recess 56 and turned from the position illustrated in Figure 9 through an angle of 90 degrees to the position illustrated, e. g., in Figure 1 or 8, the entire valve, including elements 42 and 43 and key 44, is turned as a unit thereby closing the meter supply port 49 and the transverse passage 57 but permitting a direct flow from the supply pipe 29 through the passage 48, the interior 38 of the housing and the diagonal port 60 which then communicates with the utility outlet 32.

The meter 20 may then be removed or repaired while a continuous supply of gas is provided through the by-pass.

Upon removal of the meter 20 or substitution of a new one, it is often desirable, though not essential, to charge the latter with gas and likewise to empty any undesired air from possible entrapment within the outlet 26 or inlet 27. This may be accomplished, if desired, by initially cracking the port 49 as by notching said port as at 82 or otherwise increasing its diameter with respect to the port 50, i. e., increasing the angle of its communication with the port 50. Thereby, the port 49 may communicate partially with the outlet 26 while the port 60 is still in communication with the service outlet 32 but while the lateral passage 57 is still closed. After the pipe 21, the meter 20, and even the pipe 22 are thus purged of air, the pipe 22 may be connected and the meter cut into the circuit by closing the by-pass. The above-outlined procedure may be guided by means of the manometer gauge and may be supplemented, if desired, by appropriately aligning the handle 35 as with a mark 83 on the adjacent housing 71.

Manifestly, if desired, the by-pass may be reversed, so that the service outlet 32, for example, and the supply inlet 27 may be used respectively in a reversed relationship, i. e., the service outlet 32 may be connected with the supply pipe 29 and the service pipe 31 connected with the supply inlet 28. It is also possible to rearrange the valve elements or to make them integral with one another, although by the instant construction a better seating has been found possible for the respective valve elements and replacement or repair is facilitated.

The instant construction of the housing is such as to provide a desired lightness coupled with strength. A suitable fluted construction on the exterior surface of the housing may be in the form of reinforcing ribs, one of which may be continuous with the perforate ears 100 usable for mounting or hanging the meter as well as the instant dual-purpose bar.

This invention features the provision of a modified meter-support bar and an improved by-pass of commercially acceptable construction, providing in a feasible manner, a continued flow of a metered service fluid to a place of use. The invention likewise features an improved selective valve and optional intermediate feed construction, an improved operating mechanism, an improved gauge connection, improved tamper-proof features, and an overall simplified construction acceptable as an adequate substitute for the conventional meter bar now in use but having an added by-pass function for achieving the advantages heretofore set forth.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what we claim as new and desire to secure by Letters Patent is:

1. For a meter of the character described having an inlet connection at one side thereof and an outlet connection at the other opposite side thereof, a combined support and by-pass comprising an elongated tubular housing having connecting means at opposite ends thereof for connection to said inlet and outlet connections, a fluid supply inlet and outlet also at opposite ends of said housing, valve means at each end of said housing interconnected for simultaneous operation, said valve means in one position connecting said fluid supply inlet and outlet through said tubular housing while closing off the meter inlet and outlet connections and in another position connecting said fluid supply inlet and outlet through said meter inlet and outlet connections while closing off said by-pass to fluid flow therethrough at the fluid supply outlet end thereof, the said elongated tubular housing being in fluid communication with said fluid supply inlet in both positions of said valve means.

2. A by-pass for a fluid meter comprising an elongated hollow housing having connecting means at opposite ends thereof for connection to the inlet and outlet of a meter, fluid supply inlet and outlet means also at opposite ends of said housing, valve means at each end of said housing interconnected for simultaneous operation by means extending through said elongated housing, said valve means in one position connecting said fluid supply inlet and outlet through said elongated housing while closing off the meter inlet and outlet connections and in another position connecting said fluid supply inlet and outlet through said meter while closing off said by-pass to fluid flow therethrough, said elongated housing having a single normally closed opening at one end thereof providing access to simultaneously control said valve means and a removable plug means in said opening forming a fluidtight closure.

3. For a meter of the character described having an inlet connection at one side thereof and an outlet connection at the other side thereof, a combined hollow meter-support bar and by-pass comprising an elongated tubular housing, a fluid supply inlet passage at one end of said housing, a fluid supply outlet passage at the opposite end of said housing, one of said passages being radially disposed with relation to the axis of said tubular housing, one of said meter inlet and outlet connections being radially disposed with relation to said housing and in alignment with its associated fluid supply passage, valve means at opposite ends of said tubular housing interconnected for simultaneous operation by means extending through said tubular housing, said valve means in one position connecting said fluid supply inlet passage and said fluid supply outlet passage through said elongated housing while closing off said meter inlet and outlet connections and in another position connecting said fluid supply inlet and outlet passages through the meter connections while closing off the by-pass through said tubular housing, said valve means having an axis of rotation which coincides with the axis of said tubular housing, an axial opening at one end of said tubular housing to provide access to operate said valve means, and a fluid-tight sealing means to close said opening.

4. A combined fluid meter-support bar and by-pass comprising an elongated tubular housing, a fluid supply inlet passages at one end of said housing and a fluid supply outlet passage at the opposite end of said housing, one of said passages being radially disposed with relation to the axis of said tubular housing, a meter inlet connection at said one end of said tubular housing radially disposed with relation thereto, and a meter outlet connection at the other end of the housing being also radially disposed with relation thereto, one of said connections being in alignment with its associated fluid supply passage, valve fluid supply inlet passage at one end of said housing opposite ends of said tubular housing interconnected for simultaneous operation by connecting means extending through said tubular housing, there being non-symmetrical keyways formed in adjacent portions of said separate valve elements, said connecting means comprising a key having non-symmetrical and portions corresponding to and axially slidable into engagement with the keyways in the adjacent portions of said separate valve elements in one relative position of the said valve elements for holding the latter in proper position relative to one another for common rotation, said valve means in one position connecting said fluid supply inlet and said fluid supply outlet through said elongated housing while closing off said meter inlet and outlet connections, and in another position connecting said fluid supply inlet and outlet through the meter inlet and outlet connections while closing off the by-pass through said tubular housing, said valve means having an axis of rotation which coincides with the axis of said tubular housing, an axial opening at one end of said tubular housing to provide access to operate said valve means and a fluidtight sealing means forming a removable closure for said opening.

5. A device as described in claim 3 wherein said valve means at the fluid supply outlet end of said tubular housing comprises a diagonally disposed passageway which in one position interconnects the central interior of said tubular housing with said fluid supply outlet and which in the other position of said valve means is sealed off to prevent fluid flow from said tubular housing to said fluid supply outlet.

6. A device as described in claim 3 in which the said axial opening is adapted to admit a crank member having a non-circular end portion, there being a coacting non-circular socket formed in the exposed end of said valve means, and means on said housing and said crank for interengagement for locking said crank in said socket in all but one relative rotative position thereof.

7. A by-pass for a fluid flow device comprising an elongated hollow housing having ports at opposite ends thereof for communication with the inlet and outlet ports, respectively, of a fluid flow device, a fluid inlet at one end of said housing, and a fluid outlet at the opposite end of said housing, valve means at each end of said housing connected for simultaneous operation, each said valve means including a port communicable with said housing ports, said valve means in one position connecting said inlet and said outlet through said housing while closing said housing ports, and in another position connecting said inlet and said outlet through said device while closing off the by-pass, the intercommunicating port area between said valve means and said device being greater at the in let end of said housing than at the outlet end, whereby upon actuation of said valve means from by-pass flow position to device flow position communication is established between the device and the valve means ports first at the inlet end of the housing, and then at the outlet end thereof, thereby filling the device with fluid before communication is established from the device to said outlet port.

8. A by-pass as described in claim 7, wherein said greater port area at the inlet end of said housing comprises a notch formed at the edge of one of the ports at said inlet end.

COURTNEY C. DOUGLAS.
WALTER I. THRALL.

REFERENCES CITED

The following references are of record in the file of this patent:

UNITED STATES PATENTS

| Number | Name | Date |
|---|---|---|
| 940,920 | Burhorn | Nov. 23, 1909 |
| 1,836,481 | Lutz | Dec. 15, 1931 |
| 2,240,223 | Muselier | Apr. 29, 1941 |

FOREIGN PATENTS

| Number | Country | Date |
|---|---|---|
| 16,579 | Great Britain | 1910 |
| 479,230 | Great Britain | Feb. 2, 1938 |